(12) United States Patent
Kawaguchi

(10) Patent No.: US 11,188,598 B2
(45) Date of Patent: Nov. 30, 2021

(54) DOCUMENT DATA PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Tadafumi Kawaguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/893,077

(22) Filed: Jun. 4, 2020

(65) Prior Publication Data
US 2021/0182345 A1    Jun. 17, 2021

(30) Foreign Application Priority Data
Dec. 16, 2019 (JP) .............................. JP2019-226129

(51) Int. Cl.
| G06F 16/00 | (2019.01) |
| G06F 16/93 | (2019.01) |
| G06F 16/9035 | (2019.01) |
| G06F 16/903 | (2019.01) |
| G06F 17/17 | (2006.01) |
| G06F 16/33 | (2019.01) |
| G06F 16/9038 | (2019.01) |

(52) U.S. Cl.
CPC .......... *G06F 16/93* (2019.01); *G06F 16/3334* (2019.01); *G06F 16/9035* (2019.01); *G06F 16/9038* (2019.01); *G06F 16/90344* (2019.01); *G06F 17/175* (2013.01)

(58) Field of Classification Search
CPC ...................................................... G06F 16/93
See application file for complete search history.

(56) References Cited

U.S. PATENT DOCUMENTS

2009/0199090 A1* 8/2009 Poston ................... G06Q 10/10
715/255
2018/0189691 A1* 7/2018 Oehrle ................ G06Q 10/063

FOREIGN PATENT DOCUMENTS

| JP | H0644066 A | 2/1994 |
| JP | 2010-15441 A | 1/2010 |
| WO | 2018/66083 A1 | 4/2018 |

OTHER PUBLICATIONS

Mrksic et al., "Semantic Specialisation of Distributional Word Vector Spaces using Monolingual and Cross-Lingual Constraints," The SimLex-999 web page, Jun. 1, 2017.
Mu et al., "All-But-the-Top: Simple and Effective Post-Processing for Word Representations," ICLR, Mar. 19, 2018.

\* cited by examiner

*Primary Examiner* — Ajith Jacob
(74) *Attorney, Agent, or Firm* — Oliff PLC

(57) ABSTRACT

A document data processing apparatus includes a memory and a processor. The memory stores a distributed-representation set including multiple distributed representations corresponding to multiple pieces of data. The processor is configured to modify the distributed-representation set on the basis of multiple data pairs and multiple scores corresponding to the data pairs. The data pairs are subjected to learning. The processor is configured to modify the distributed-representation set in such a manner that, for each of the data pairs, a value indicating a relationship in a modified distributed-representation pair corresponding to the data pair comes close to a score corresponding to the data pair.

13 Claims, 10 Drawing Sheets

US 11,188,598 B2

DOCUMENT DATA PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-226129 filed Dec. 16, 2019.

BACKGROUND

(i) Technical Field

The present disclosure relates to a document data processing apparatus and a non-transitory computer readable medium.

(ii) Related Art

Recently, distributed representation of words or the like is used in document data processing. The unit of the distributed representation is, for example, a word, a phrase, a sentence, or a document. Such a unit is called a token. This will be described below by taking distributed representation of words as an example.

In the distributed representation of words, words are expressed as multi-dimensional vectors. For example, individual words are associated with specific coordinates in a 100-dimensional vector space. In acquiring distributed representations of words, a machine learning unit such as a neural net is typically used. Hereinafter, a collection of distributed representations is denoted as a distributed-representation set.

A distributed-representation set may be used to generate a recommended-word list including one or more words similar to or closely related to a certain word. In searching documents, such a recommended-word list provided to a user may increase user convenience.

In "Semantic Specialisation of Distributional Word Vector Spaces using Monolingual and Cross-Lingual Constraints" (Nikola Mrksic, et al., arXiv:1706.00374v1, 2017), a method of providing modification to an existing distributed-representation set has been proposed. In the method, multiple synonym pairs and multiple antonym pairs are used to provide partial modification to an existing distributed-representation set. A modified distributed-representation set is obtained so that the loss defined by using a loss function is minimized.

In modification to a distributed-representation set including multiple distributed representations corresponding to multiple pieces of data (for example, multiple words), the modification method, in which synonym pairs and antonym pairs are subjected to learning, fails to use, as learning targets, data pairs having various relationships (for example, an intermediate relationship, a relationship which is not a synonym relationship but is a close relationship in terms of meaning, and a relationship which is not an antonym relationship but is a distant relationship in terms of meaning).

SUMMARY

Aspects of non-limiting embodiments of the present disclosure relate to the following technique: in modification to an existing distributed-representation set, compared with the case in which only synonym pairs and antonym pairs are subjected to learning, data pairs having various relationships may be subjected to learning.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document data processing apparatus including a memory and a processor. The memory stores a distributed-representation set including multiple distributed representations corresponding to multiple pieces of data. The processor is configured to modify the distributed-representation set on the basis of multiple data pairs and multiple scores corresponding to the data pairs. The data pairs are subjected to learning. The processor is configured to modify the distributed-representation set in such a manner that, for each of the data pairs, a value indicating a relationship in a modified distributed-representation pair corresponding to the data pair comes close to a score corresponding to the data pair.

BRIEF DESCRIPTION OF THE DRAWINGS

Exemplary embodiments of the present disclosure will be described in detail based on the following figures, wherein.

DETAILED DESCRIPTION

Figure 1:
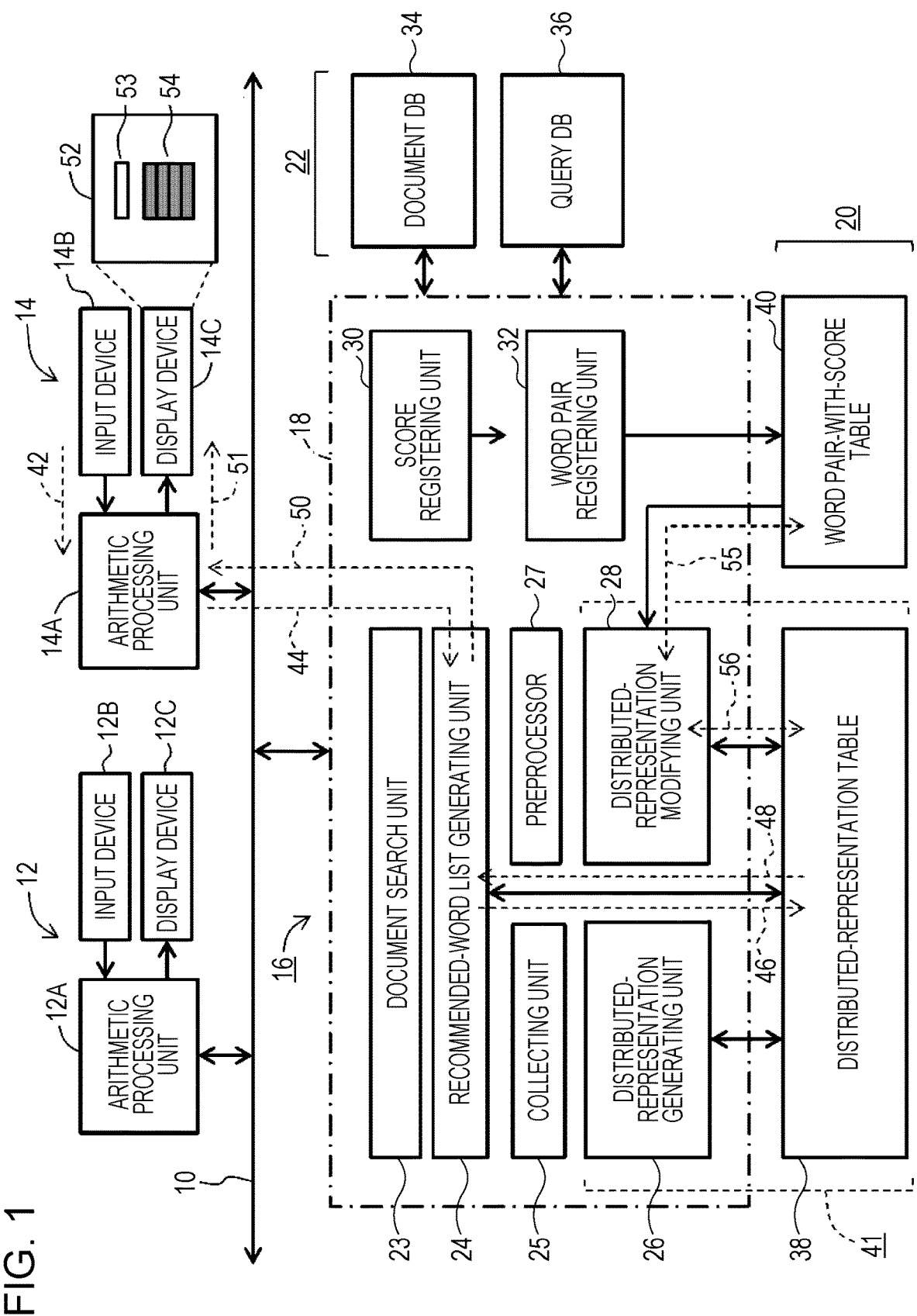
FIG. 1 is a block diagram illustrating an exemplary configuration of a document data processing apparatus according to an exemplary embodiment.

Exemplary embodiments will be described below on the basis of the drawings.

Overview of Exemplary Embodiments

A document data processing apparatus according to an exemplary embodiment includes a memory and a processor. The memory is used to store a distributed-representation set including multiple distributed representations corresponding to multiple pieces of data. The processor is configured to modify the distributed-representation set on the basis of multiple data pairs, which are subjected to learning, and multiple scores corresponding to these data pairs. Specifically, the processor is configured to modify the distributed-representation set so that, for each data pair, the value indicating the relationship in a modified distributed-representation pair corresponding to the data pair comes close to the score corresponding to the data pair.

In the configuration, the existing distributed-representation set, which has been already generated, is subjected to modification. In modification of the distributed-representation set, multiple cores corresponding to multiple data pairs are used. The individual scores serve as target values for the values indicating the relationship in modified distributed-representation pairs. That is, the distributed-representation set is modified so that, for each data pair, the value indicating the relationship in a modified distributed-representation pair comes close to the score which is a target value. Various values may be set as a score. Thus, data pairs having various relationships may be used as learning targets.

In the configuration, individual pieces of data indicate token data, such as word data, sentence data, and document data. Basically, one piece of data is associated with one distributed representation. A distributed representation is actually formed of a multi-dimensional vector. Data pairs with scores, which are obtained by integrating data pairs with their scores, may be managed, or scores and the data pairs may be managed separately. Scores may be specified by a user, or may be calculated automatically by using sentence analysis or other method. Scores may be calculated through a statistical process on questionnaire results from multiple users. Scores may be specified on the basis of multiple sub-scores. Data obtained through conversion of knowledge into a number(s) may be considered as a score or a sub-score set. A value indicating the relationship in a modified distributed-representation pair is represented typically as an inner product, and may be represented as a distance between vectors, the degree of similarity, or the like. In the exemplary embodiment, a machine learning unit is used to search for the optimal solution of a modified distributed-representation set. The concept of the processor will be described in detail below.

In either way, scores are used in modification to a distributed-representation set, enabling a data pair, which has any relationship, to be subjected to learning without use of extreme relationships, such as the close relationship and the distant relationship. In other words, a wide range of choices of selection of learning targets are obtained. Modification to a distributed-representation set based on various data pairs improves the quality of the distributed-representation set.

In the exemplary embodiment, the processor is configured to modify a distributed-representation set so that the loss calculated by using a loss function is minimized. The loss function involves calculation, for each data pair, of subtracting the value, indicating the relationship in the data pair, from its score. The difference obtained through the calculation indicates how far the value indicating the relationship is from the score which is a target value. A distributed-representation set is improved so that the difference is made small. Other evaluation function other than the loss function may be used. The loss function may have a term, which is added thereto, for suppressing or limiting modification to a distributed-representation set.

In the exemplary embodiment, the value indicating the relationship is an inner product of the two distributed representations included in a modified distributed-representation pair. The score is a target value that is to be compared with the inner product. The smaller the intersection angle between the two vectors in a modified distributed-representation pair is, the smaller the inner product is. The distributed-representation set is modified so that, for each data pair, the inner product comes close to the score.

In the exemplary embodiment, the processor is configured to calculate, for each data pair, a score on the basis of multiple sub-scores defined for the data pair. Use of multiple sub-scores enables a score to be defined in a multifaceted manner. A score may be manipulated easily in accordance with the condition.

In the exemplary embodiment, the processor is configured to calculate a score through weighted addition of multiple sub-scores. In the exemplary embodiment, the processor is configured to change a weight list, which is used in weighted addition, on the basis of a user instruction or a document category. For example, a weight list may be changed in accordance with the document category, to which accumulated documents belong, or the document category to which search-target documents belong. Alternatively, a weight list may be changed on the basis of a user instruction.

In the exemplary embodiment, the loss function further involves calculation, for each data pair, using a modified distributed-representation pair corresponding to a negative data pair specified by using the data pair. The negative data pair is other than the data pair, and functions as a so-called negative example.

In the exemplary embodiment, the multiple data pairs, which are subjected to learning, have scores. The memory is used to store a table having multiple data pairs with scores. The processor is configured to refer to the table. Alternatively, the multiple data pairs, which are subjected to learning, have sub-score sets. The memory is used to store a table having multiple data pairs with sub-score sets. The processor is configured to refer to the table.

In the exemplary embodiment, the processor is configured to specify multiple data pairs on the basis of multiple queries which are input in searching documents. A query is a string indicating query information (typically, a search keyword). Such a string indicates a matter in which a user is interested. Specification of multiple data pairs based on queries enables modification to a distributed-representation set to be appropriate for the user.

In the exemplary embodiment, the processor is configured to generate a recommendation list, having one or more pieces of related data which are related to data that is input by a user, on the basis of the distributed-representation set. The processor is configured to present a recommendation list to the user. Modification to a distributed-representation set improves the recommendation list. The recommendation list is, for example, a recommended-word list.

A document data processing method according to the exemplary embodiment has a specification process and a modification process. In the specification process, for each data pair that is subjected to learning, a score indicating the relationship between the two pieces of data included in the data pair is specified. In the modification process, a distributed-representation set having multiple distributed representations corresponding to multiple pieces of data is modified on the basis of multiple data pairs, which are subjected to learning, and multiple scores corresponding to the data pairs. This method involves partial modification to an existing distributed-representation set which has been already generated. A distributed-representation set may be modified by using scores. Thus, data pairs having various relationships may be subjected to learning.

A program according to the exemplary embodiment is executed by the document data processing apparatus, and has a reference function and a modification function. The reference function is a function of referring to a score corresponding to each data pair that is subjected to learning. The modification function is a function of modifying a distributed-representation table having multiple distributed representations corresponding to multiple pieces of data so that, for each data pair that is subjected to learning, the value indicating the relationship in a modified distributed-representation pair corresponding to the data pair comes close to the score corresponding to the data pair.

The program is installed in the document data processing apparatus over a network or through a portable storage medium. The document data processing apparatus may be formed of an information processing apparatus which processes document information. Some or all of the functions included in the program may be provided on a server connected over a network.

Details of the Exemplary Embodiments

FIG. 1 illustrates an exemplary configuration of a system according to an exemplary embodiment. The illustrated system includes a network 10, terminal apparatuses 12 and 14, and a document data processing apparatus 16. Each of the terminal apparatuses 12 and 14 is formed of a computer which is an information processing apparatus. The terminal apparatus 12 includes an arithmetic processing unit 12A, an input device 12B, and a display device 12C. The arithmetic processing unit 12A is formed of a processor (for example, a central processing unit (CPU)) which executes programs. The input device 12B includes a keyboard and a pointing device. The display device 12C is formed, for example, of a liquid-crystal display (LCD). Like the terminal apparatus 12, the terminal apparatus 14 also includes an arithmetic processing unit 14A, an input device 14B, and a display device 14C. The network 10 is, for example, an intranet or the Internet.

The document data processing apparatus 16 is formed of a computer which is an information processing apparatus. The document data processing apparatus 16 includes a processor 18, a memory 20, and a memory 22 in the illustrated exemplary configuration. A single memory may be included instead of the two memories 20 and 22, or three or more memories may be included. Each of the memories 20 and 22 is formed of a semiconductor memory, a hard disk, or the like. Programs (not illustrated) for executing the document data processing method according to the exemplary embodiment are stored in the memory 20 or the memory 22. The processor 18 executes the programs. The document data processing apparatus 16 includes an input device and a display device (not illustrated). Such user interfaces may be used to perform a document search described below.

The processor 18 performs multiple functions. In FIG. 1, these functions are illustrated by using multiple blocks. Specifically, in the illustrated exemplary configuration, the processor 18 includes a document search unit 23, a recommended-word list generating unit 24, a collecting unit 25, a distributed-representation generating unit 26, a preprocessor 27, a distributed-representation modifying unit 28, a score registering unit 30, and a word pair registering unit 32. The memory 20 is used to store a distributed-representation table 38, and also store the word pair-with-score table 40. On the memory 22, a document database (DB) 34 and a query DB 36 are constructed. Each configuration will be described in detail below.

In accordance with a search condition specified by a user, the document search unit 23 accesses the document DB 34 and specifies documents satisfying the search condition. As the search condition, one or more search keywords are typically input. In inputting search keywords, support for the input operation is provided such that a recommended-word list is presented to the user. For example, one or more words similar to an input word are extracted automatically, and a recommended-word list having the extracted words is generated for presentation to the user. The recommended-word list generating unit 24 is in charge of generating a recommended-word list. In generating a recommended-word list, the distributed-representation table 38 is used.

The distributed-representation table 38 has multiple words and multiple distributed representations corresponding to the words, according to the exemplary embodiment. The distributed-representation table 38 is formed actually of a distributed-representation set, which has multiple distributed representations and which is to be modified. Each of the individual distributed representations is a multi-dimensional vector. The number of dimensions is, for example, 100, 300, or 500. The numbers described in the application are merely exemplary.

The collecting unit 25 collects multiple documents which are referred to in generating the distributed-representation table. Documents may be collected manually or automatically. For example, information on the Internet may be collected. The collected documents may constitute all or part of the document DB 34.

The distributed-representation generating unit 26 automatically generates multiple distributed representations corresponding to multiple words on the basis of the documents that are referred to. In generating multiple distributed representations, various known methods may be used. For example, a method such as Word2Vec may be used. The generated distributed representations constitute a distributed-representation set.

Prior to modification to a distributed-representation set, the preprocessor 27 applies preprocessing to the distributed-representation set. An example of the preprocessing is normalization. For example, ALL-BUT-THE-TOP may be applied to a distributed-representation set ("ALL-BUT-THE-TOP: Simple and Effective Postprocessing for Word Representations" (Jiaqi Mu, Pramod Viswanath, arXiv: 1702.01417v2, 2018)). Execution of normalization causes the effect of modification to be easily exerted. If normalization is performed after modification, the effect of the modification is reduced. Thus, if normalization is performed, the normalization is desirably performed before modification.

The distributed-representation modifying unit 28 is a module for performing modification to an existing distributed-representation set. The modification is performed partially, that is, limitedly. In this point, it is different from re-generation of a distributed-representation set. In the modification, the word pair-with-score table 40 is referred to. The word pair-with-score table 40 has multiple word data pairs (hereinafter referred to as word pairs simply) that are subjected to learning. Each word pair is provided with a score. As described below, the score functions as a target value with which the inner product of a modified distributed-representation pair (that is, two vectors) is compared. For example, the score is represented by a value from 0.0 to 1.0. The lower limit and the upper limit may be defined freely. The increments of the score may be defined freely. In managing each word pair, integration of the word pair with the corresponding score, that is, management of the word pair and the score on the same table, facilitates management of the word pair and the score. As long as the correspondence between the word pair and the score may be specified, the word pair and the score may be managed separately.

Specifically, the distributed-representation modifying unit 28 gradually improves a distributed-representation set so that, specifically, the loss defined through a loss function is minimized. The distributed-representation set obtained when the loss is minimized is used as the optimal solution which is included in the updated distributed-representation table 38. The loss function includes a term of calculating, for each word pair, the difference between the inner product of a modified distributed-representation pair and the score which is a target value. The loss function will be described in detail below.

The word pair registering unit 32 selects, for registration, multiple word pairs which are to be included in the word pair-with-score table 40. For example, such word pairs are collected on the Internet, from the document DB 34, and/or from the query DB 36.

The score registering unit 30 provides a score to each word pair. A score is provided manually by a user (specifically an operator who manages the distributed-representation set) or automatically. A statistical process may be applied to questionnaire results, and scores may be determined automatically from the result. In this case, word pairs may be displayed to users, and values which are input from the users may be received as scores.

The document DB 34 includes multiple documents that are to be searched, or manages the documents. The query DB 36 stores multiple strings (such as words) which have been input from users in document searches, or manages the strings. The processor 18 is configured to refer to information in the memories 20 and 22.

A part 41 corresponds to a machine learning unit. Specifically, the part includes the distributed-representation generating unit 26, the distributed-representation modifying unit 28, and the distributed-representation table 38. A neural net may be used as a machine learning unit. The machine learning unit may be separated into the following parts: a part that performs machine learning; and a part that uses the machine learning results.

Operations in a document search will be described on the basis of FIG. 1. For example, on the terminal apparatus 14, the input device 14B is used to specify a search keyword (see reference numeral 42). A search request including the search keyword is transmitted from the arithmetic processing unit 14A to the processor 18 of the document data processing apparatus 16 (see reference numeral 44). The recommended-word list generating unit 24 refers to the distributed-representation table, and specifies one or more recommended words related to the search keyword (see reference numerals 46 and 48). A recommended-word list including the specified recommended words is generated. The recommended-word list is transmitted to the arithmetic processing unit 14A (see reference numeral 50). The recommended-word list is transmitted from the arithmetic processing unit 14A to the display device 14C (see reference numeral 51), and is displayed on the display device 14C.

In FIG. 1, a display screen 52 is schematically illustrated. When a search keyword is input in a query field 53, a recommended-word list 54 is displayed near the query field 53. Reference to the recommended-word list 54 enables a more appropriate search keyword to be selected. For example, in a distributed-representation space (multi-dimensional vector space), multiple distributed representations close to the distributed representation corresponding to the search keyword are specified, and the words corresponding to the specified distributed representations are used as recommended words. Improvement, that is, fine tuning, of an existing distributed-representation set improves the quality of the recommended-word list 54.

The distributed-representation modifying unit 28 performs the improvement to an existing set. Specifically, the word pair-with-score table 40 is referred to (see reference numeral 55), and a distributed-representation set is modified on the basis of multiple word pairs and scores (see reference numeral 56). A specific modification method will be described in detail below.

Figure 2:
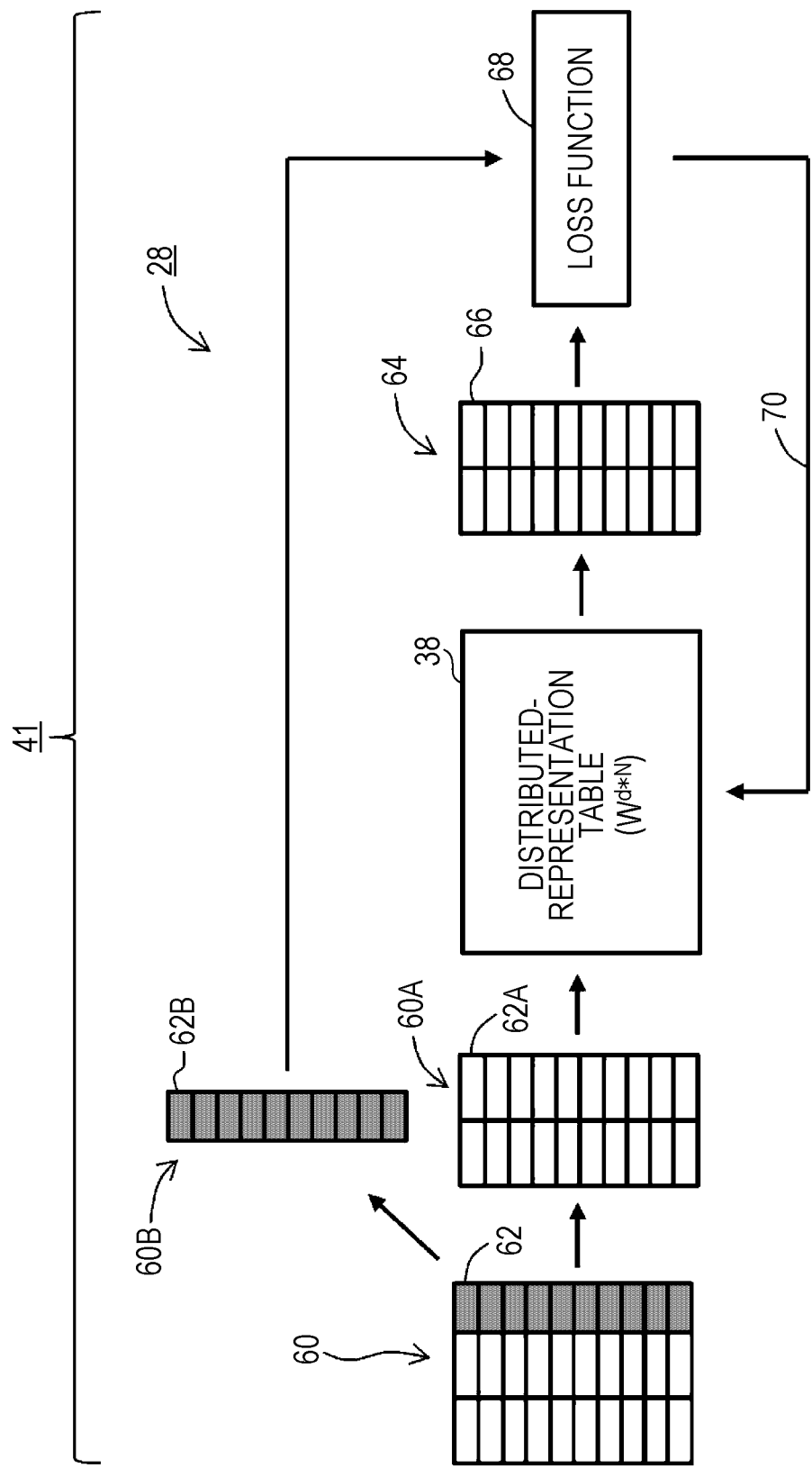
FIG. 2 is a conceptual diagram illustrating a method of modifying distributed representations, according to the exemplary embodiment.

FIG. 2 is a conceptual diagram illustrating a first modification method performed by the distributed-representation modifying unit 28.

A word pair-with-score list 60 actually constitutes the word pair-with-score table described above. The word pair-with-score list 60 has multiple word pairs-with-score 62. In the word pairs-with-score 62, multiple word pairs 62A in a word pair list 60A are referred to sequentially. The distributed representation corresponding to each word is sequentially specified on the basis of the distributed-representation table 38. The symbol, d, represents the number of dimensions, and N represents the data count.

A distributed representation is specified for each word. Thus, a distributed-representation pair list 64 corresponding to the word pair list 60A is generated. The distributed-representation pair list 64 has multiple distributed-representation pairs 66. The multiple distributed-representation pairs are applied to the loss function 68 sequentially. More correctly, in addition to these, temporarily-modified distributed-representation pairs, which correspond to the multiple distributed-representation pairs, are also applied to the loss function 68 sequentially.

In contrast, a score list 60B is extracted from the word pair-with-score list 60. The score list 60B has multiple scores 62B. The scores 62B are applied to the loss function 68 sequentially.

A distributed-representation set, which actually constitutes the distributed-representation table 38, is repeatedly modified so that, for each word pair, the difference between the inner product of the distributed-representation pair, which has been modified temporarily, and the score, which is a target value, is made smaller (see reference numeral 70). The distributed-representation set obtained when the minimization condition is satisfied is used as the optimal solution. Actually, in the machine learning unit 41 such as a neural net, the gradient descent method and the backpropagation are applied to obtain the optimal solution.

Figure 3:
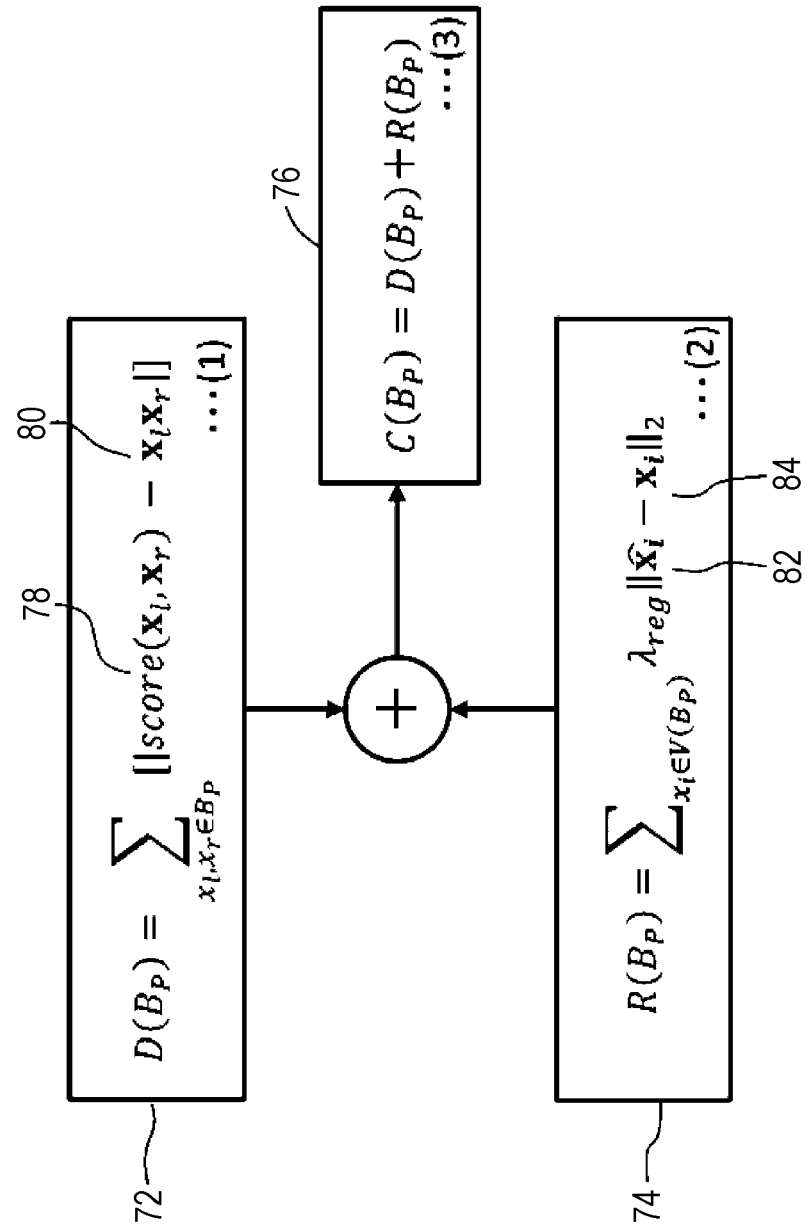
FIG. 3 is a diagram illustrating an exemplary loss function.

FIG. 3 is a conceptual diagram illustrating the loss function illustrated in FIG. 2. Loss $C(B_p)$ is defined as a value obtained by adding a loss element $D(B_p)$ 72 and a loss element $R(B_p)$ 74 together (see reference numeral 76). The loss element $D(B_p)$ 72 is calculated by using Expression (1) described below. In the description below, the forms of the symbols in the computational expression are specified by using braces.

$$D(B_P) = \sum_{x_l, x_r \in B_P} [|\text{score}(x_l, x_r) - x_l x_r|] \tag{1}$$

In the expression, $x_l$ and $x_r$ constitute a word pair, and $x_l$ (in bold) and $x_r$ (in bold) constitute a distributed-representation pair corresponding to the word pair of $x_l$ and $x_r$. The symbol, $B_p$, indicates a batch as a word data set. The symbol, $\text{score}(x_l, x_r)$ indicates the score of the word pair of $x_l$ and $x_r$ (see reference numeral 78 in FIG. 3). The symbol, $x_l x_r$ (in bold), indicates the inner product of the distributed-representation pair of $x_l$ (in bold) and $x_r$ (in bold) (see reference numeral 80 in FIG. 3). In Expression (1), for each data pair, the difference between the inner product and the score is calculated, and the total is obtained.

In contrast, the loss element $R(B_p)$ 74 is calculated by using Expression (2) described below. The second term for calculating the loss element $R(B_p)$ 74 functions as a term for suppressing or limiting modification to the distributed-representation set.

$$R(B_p) = \Sigma_{x_i \in V(B_p)} \lambda_{reg} \|\hat{x}_i - x_i\|_2 \qquad (2)$$

In Expression (2), $\lambda$reg represents a hyperparameter. The symbol, $x_i$ (in bold, with a hat) represents a distributed representation before modification, and $x_i$ (in bold) represents a distributed representation after modification. In Expression (2) described above, for each word, the L2 norm of the difference between a distributed representation before modification and a distributed representation after modification is calculated, and the total is obtained.

Loss $C(B_p)$ is calculated by using Expression (3) described below. Adjustment of the magnitude of the hyperparameter $\lambda$reg enables adjustment of the relationship between the first term and the second term.

$$C(B_p) = D(B_p) + R(B_p) \qquad (3)$$

Instead of the inner product described above, the degree of similarity, the norm, or the like may be calculated. However, the smaller the intersection angle between two vectors is, the larger the inner product is. On the other hand, the norm is made larger. Thus, in consideration of this property, the computational expression of a loss element is to be designed.

Figure 4:
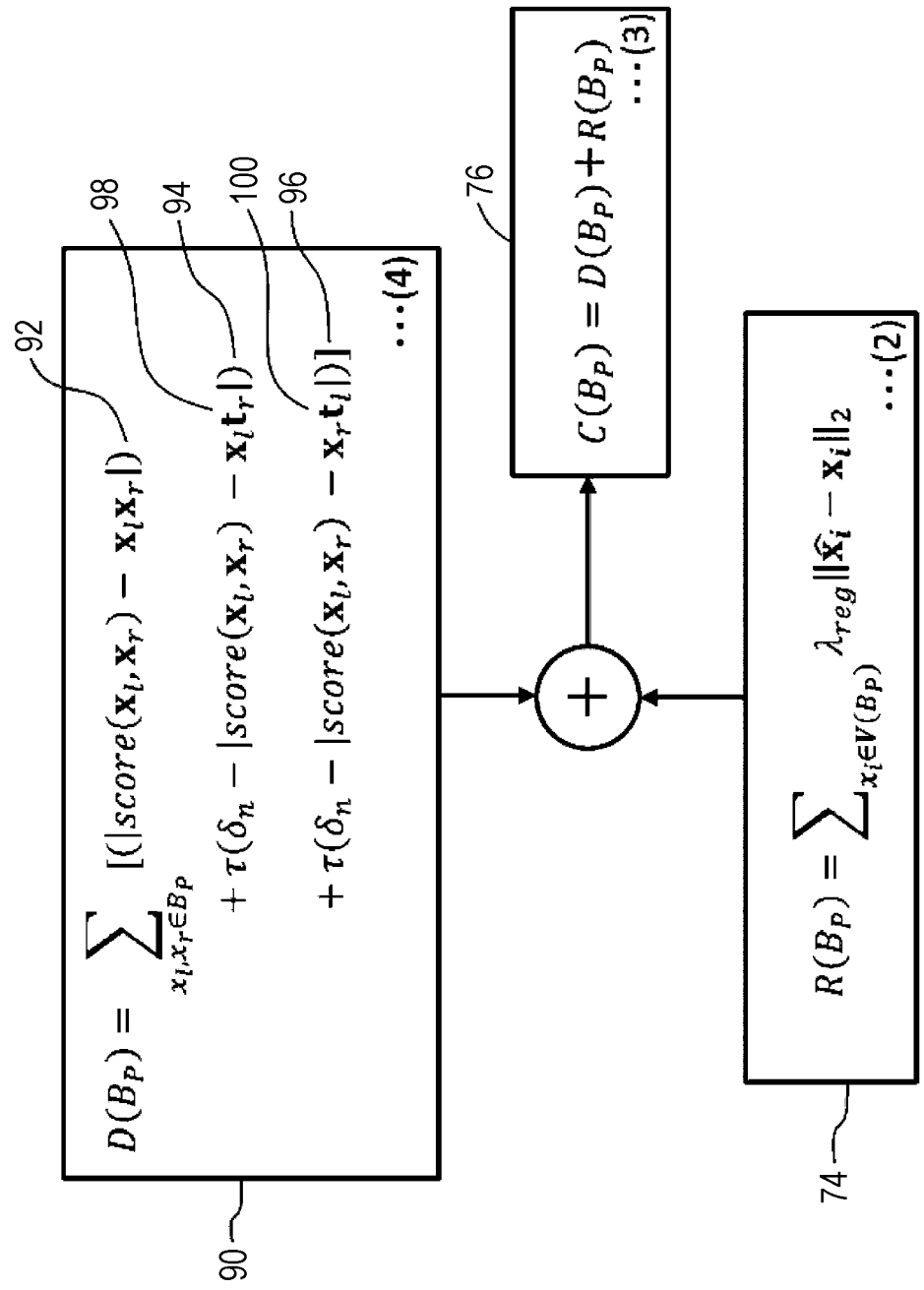
FIG. 4 is a diagram illustrating another exemplary loss function.

FIG. 4 is a conceptual diagram illustrating a modified example of the loss function. Loss $C(B_p)$ is defined as addition of a loss element $D(B_p)$ 90 and the loss element $R(B_p)$ 74 (see reference numeral 76). The part which is different from the loss function illustrated in FIG. 3 is the loss element $D(B_p)$ 90 which is calculated by using Expression (4) described below.

$$D(B_P) = \sum_{x_l, x_r \in B_P} [(|\text{score}(x_l, x_r) - x_l x_r|) + \qquad (4)$$
$$\tau(\delta_n - |\text{score}(x_l, x_r) - x_l t_r|) + \tau(\delta_n - |\text{score}(x_l, x_l) - x_r t_l|)]$$

In Expression (4), $x_l t_r$ indicates the inner product of a distributed-representation pair (the pair itself may be referred to as a negative sample pair) corresponding to a negative sample pair. The symbol, $x_r t_l$, also indicates the inner product of a distributed-representation pair corresponding to a negative sample pair. For example, the distributed representation $t_r$ is a different distributed representation which is located close to the distributed representation $x_r$. For example, the distributed representation $t_l$ is a distributed representation which is located close to the distributed representation $x_l$. The symbol, $\delta_n$, represents a margin, and $\tau(x)$ means max(0, x).

A negative sample pair is a negative example pair or a negative data pair, and, specifically, is a pair obtained by replacing only one of the words in a positive example pair, which is a normal sample pair, with another word. In generating a negative sample, various known methods may be used.

In the modified example in FIG. 4, the loss element $D(B_p)$ is calculated on the basis of the difference between a positive example and its score, the difference between the score and a first negative example, and the difference between the score and a second negative example. This enables the score to function in a multifaceted manner. The reason of use of a margin is that the influence of the negative examples is suppressed or the contribution of the negative examples with respect to the loss element is manipulated. The reason of use of the $\tau$ function is that a minus value is not produced in the integration of the differences.

Figure 10:
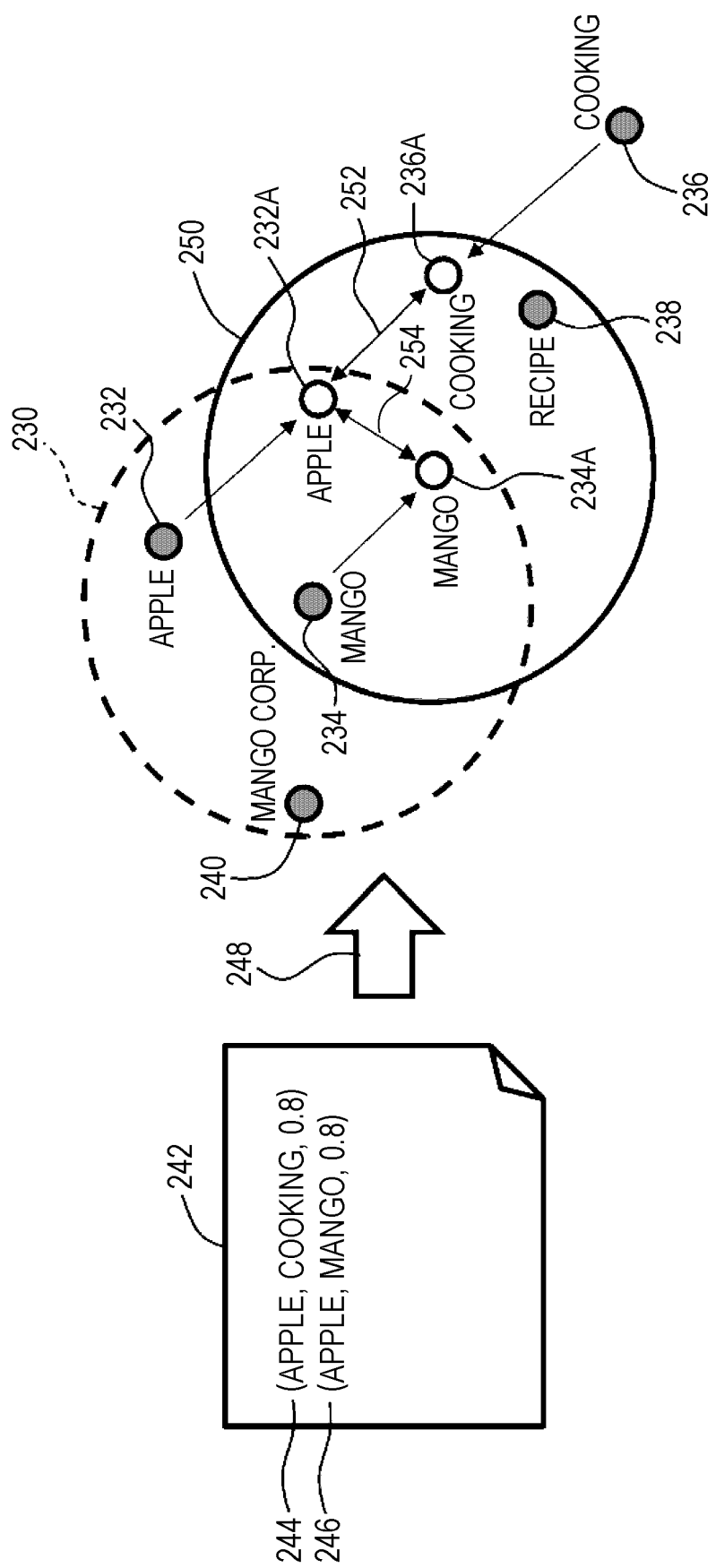
FIG. 10 is a diagram illustrating a concrete example of modifying distributed representations.

FIG. 10 illustrates a concrete example of modifying distributed representations. Specifically, FIG. 10 schematically illustrates, in the right part in FIG. 10, the states before and after modification of the distributed-representation table. Grey nodes represent nodes before modification, and white nodes represent nodes after modification.

Before modification, a node 232 corresponding to "apple", a node 234 corresponding to "mango", a node 236 corresponding to "cooking", a node 238 corresponding to "recipe", and a node 240 corresponding to "Mango Corp." have the positional relationship illustrated in FIG. 10. For example, when "mango" is input as a keyword, multiple words, which belong to the area indicated by using reference numeral 230, are presented as recommended words. That is, in the example in FIG. 10, "apple", "mango", and "Mango Corp." constitute a recommended-word list. The recommended-word list does not include "cooking". The recommended-word list is generated by the recommended-word list generating unit.

FIG. 10 schematically illustrates, in the left part, an example of the word pair-with-score table (see reference numeral 242). The example includes a word pair-with-score 244 and a word pair-with-score 246. In the word pair-with-score 244, a word pair of "apple" and "cooking" is provided with a score of "0.8". In the word pair-with-score 246, a word pair of "apple" and "mango" is provided with a score of "0.8". Reference numeral 248 denotes modification of the distributed-representation table based on the word pair-with-score table, which is performed by the distributed-representation modifying unit.

After modification, the node 232 corresponding to "apple" is moved so that a node 232A corresponding to "apple" is generated; the node 234 corresponding to "mango" is moved so that a node 234A corresponding to "mango" is generated. In addition, the node 236 corresponding to "cooking" is moved so that a node 236A corresponding to "cooking" is generated. The node 232A corresponding to "apple" and the node 234A corresponding to "mango" has a positional relationship indicating that the nodes are relatively close to each other (see reference numeral 254). Similarly, the node 232A corresponding to "apple" and the node 236A corresponding to "cooking" have a positional relationship indicating that the nodes are relatively close to each other (see reference numeral 252). After modification, when "mango" is input as a keyword, the multiple words, which belong to the area denoted by using reference numeral 250, are presented as recommended words. That is, in the example illustrated in FIG. 10, "apple", "mango", "cooking", and "recipe" constitute a recommended-word list. The recommended-word list does not include "Mango Corp."

A second modification method will be described below on the basis of FIGS. 5 to 8.

Figure 5:
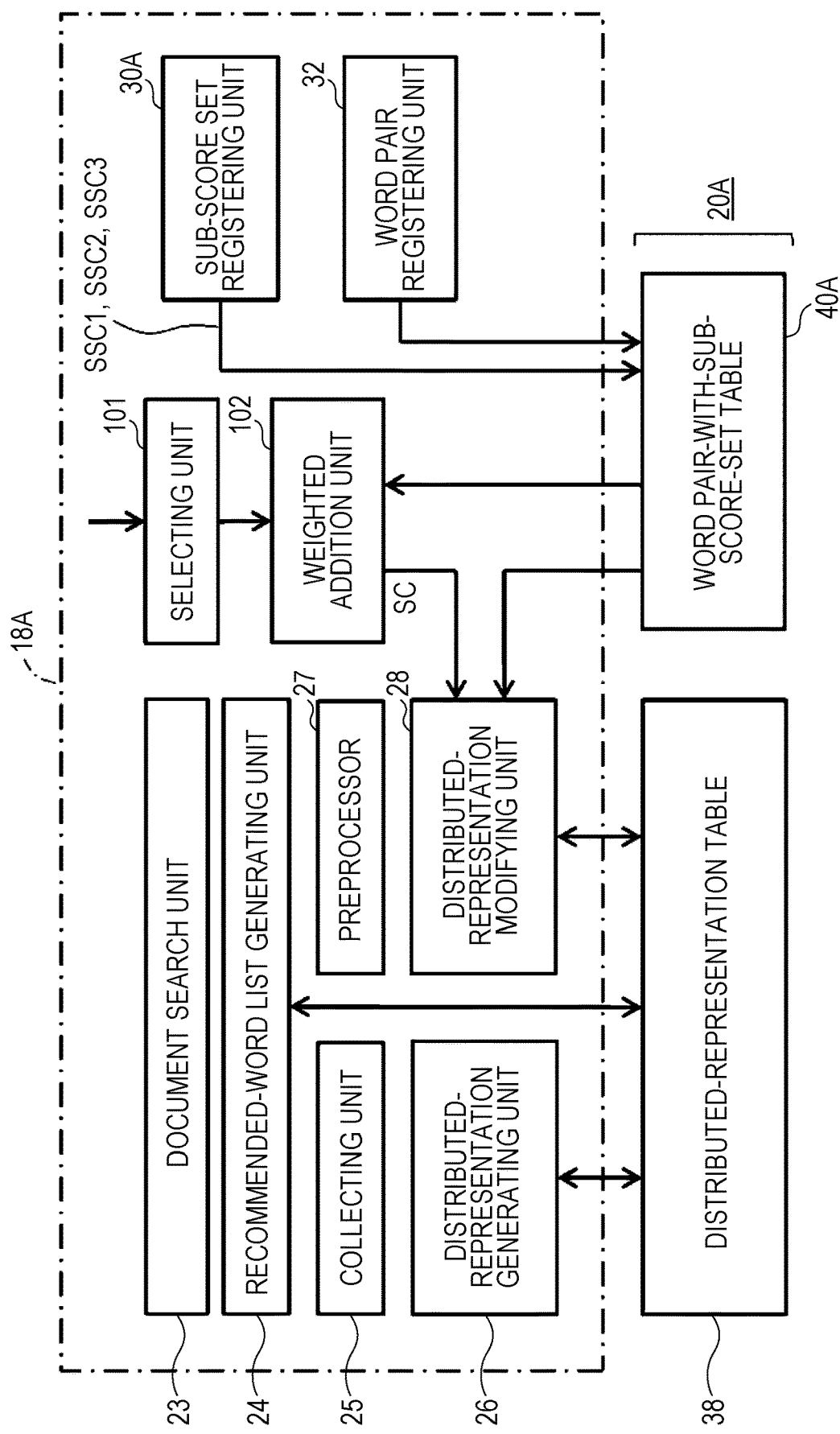
FIG. 5 is a diagram illustrating an exemplary configuration of a document data processing apparatus according to a different exemplary embodiment.

FIG. 5 illustrates a processor 18A which performs the second modification method. In the second modification method, in addition to the distributed-representation table 38, a word pair-with-sub-score-set table 40A is stored in a memory 20A. The word pair-with-sub-score-set table 40A has multiple word pairs with sub-score sets. A sub-score set registering unit 30A provides each word pair with a sub-score set. Each sub-score set is constituted by three sub-scores (SSC1, SSC2, and SSC3) in the illustrated example.

A weighted addition unit 102 calculates a score SC through weighted addition of the three sub-scores (SSC1, SSC2, and SSC3). In the weighted addition, a weight list (w1, w2, and w3) selected by a selecting unit 101 is used. For example, a specific weight list may be specified from multiple weight lists directly or indirectly on the basis of an instruction from an operator who manages or operates the distributed-representation set. Alternatively, a specific weight list may be selected automatically on the basis of the document category to which documents, which are to be searched or managed, belong. A weight list may be generated dynamically on the basis of multiple pieces of reference information. For each word pair, the distributed-representation modifying unit 28 is given the score SC generated through the weighted addition. The method of modifying a distributed-representation set constituting the distributed-representation table 38 is the same as the modification method described on the basis of FIGS. 1 to 3.

Figure 6:
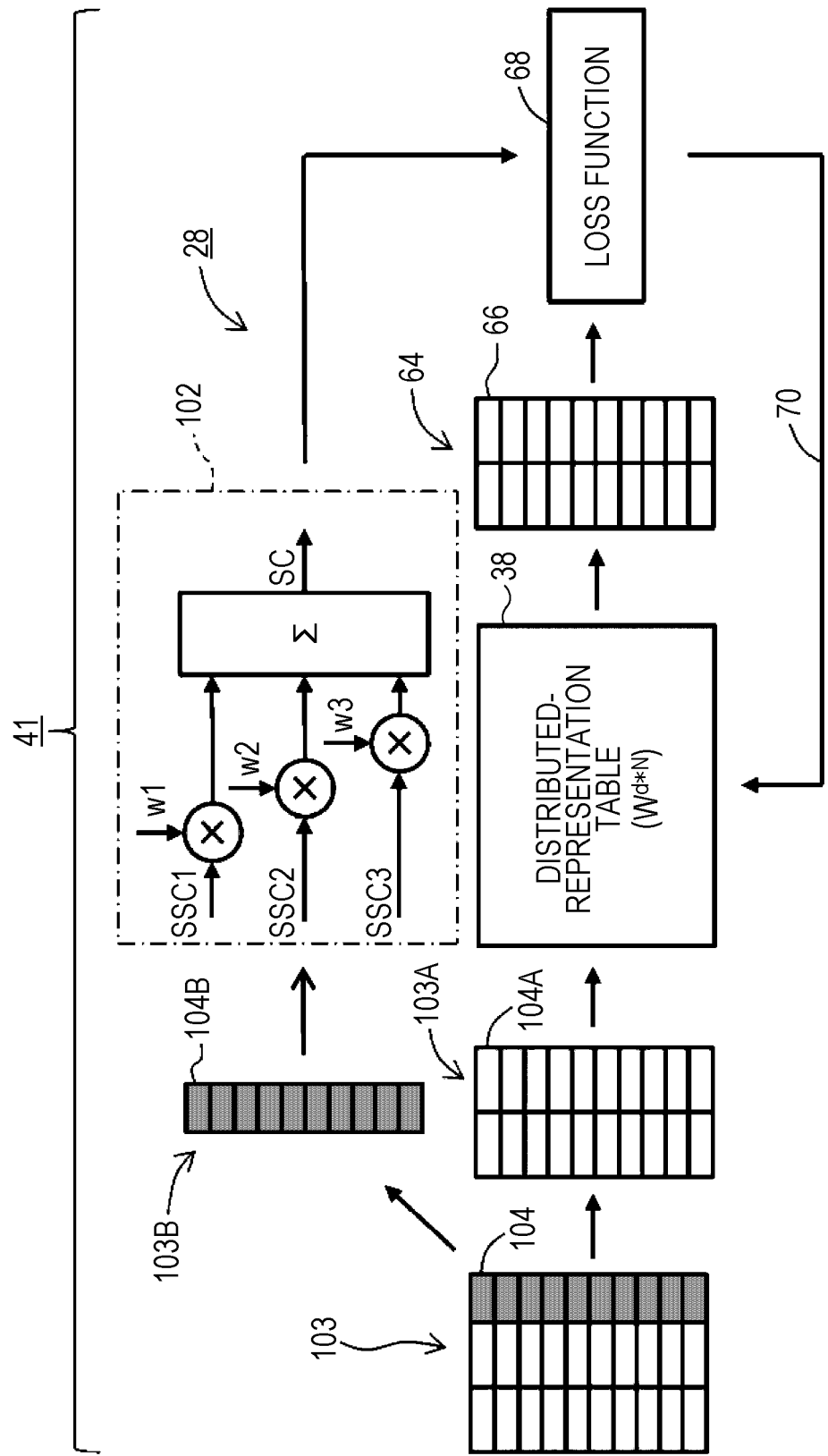
FIG. 6 is a conceptual diagram illustrating a method of modifying distributed representations, according to the different exemplary embodiment.

FIG. 6 is a conceptual diagram illustrating the second modification method. Components which are substantially identical to those in FIG. 2 are designated with identical reference numerals.

A word pair-with-sub-score-set list 103 has multiple word pairs-with-sub-score-set 104. The word pair-with-sub-score-set list 103 is separated roughly into a word pair list 103A and a sub-score set list 103B. The word pair list 103A has multiple word pairs 104A. The sub-score set list 103B has multiple sub-score sets 104B corresponding to the multiple word pairs.

For each word pair 104A, the weighted addition unit 102 calculates a score SC through weighted addition using the corresponding sub-score set (SSC1, SSC2, and SSC3). In the calculation, the corresponding weight list (w1, w2, and w3) is used. As already described, the scores SC are used in calculation of the loss.

Figure 7:
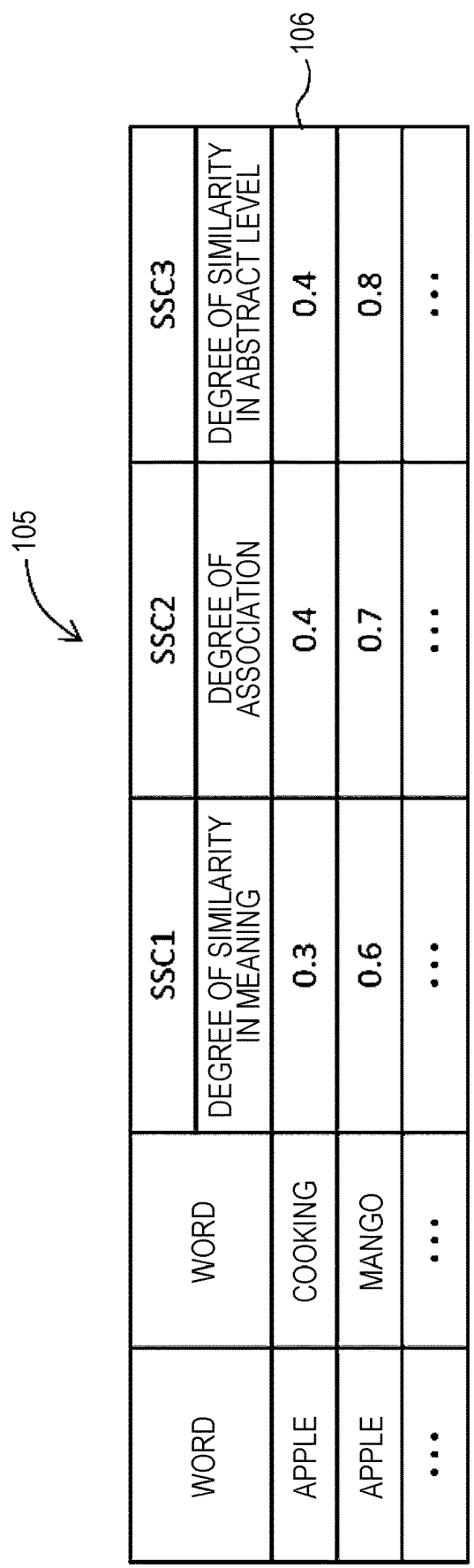
FIG. 7 is a diagram illustrating an exemplary word pair-with-sub-score-set table.

FIG. 7 illustrates a word pair-with-sub-score-set table 105 which has multiple word pairs-with-sub-score-set 106. In this example, a first sub-score SSC1 is a numeric value indicating the degree of similarity in meaning in a word pair; a second sub-score SSC2 is a numeric value indicating the degree of association in the word pair; a third sub-score SSC3 is a numeric value indicating the degree of similarity in the abstract level (or the concrete level) in the word pair. In this example, the range of change in a sub-score is between 0.0 and 1.0; the increments of a sub-score are 0.1. A sub-score set may be normalized so that the total of the three sub-scores is equal to one.

Figure 8:
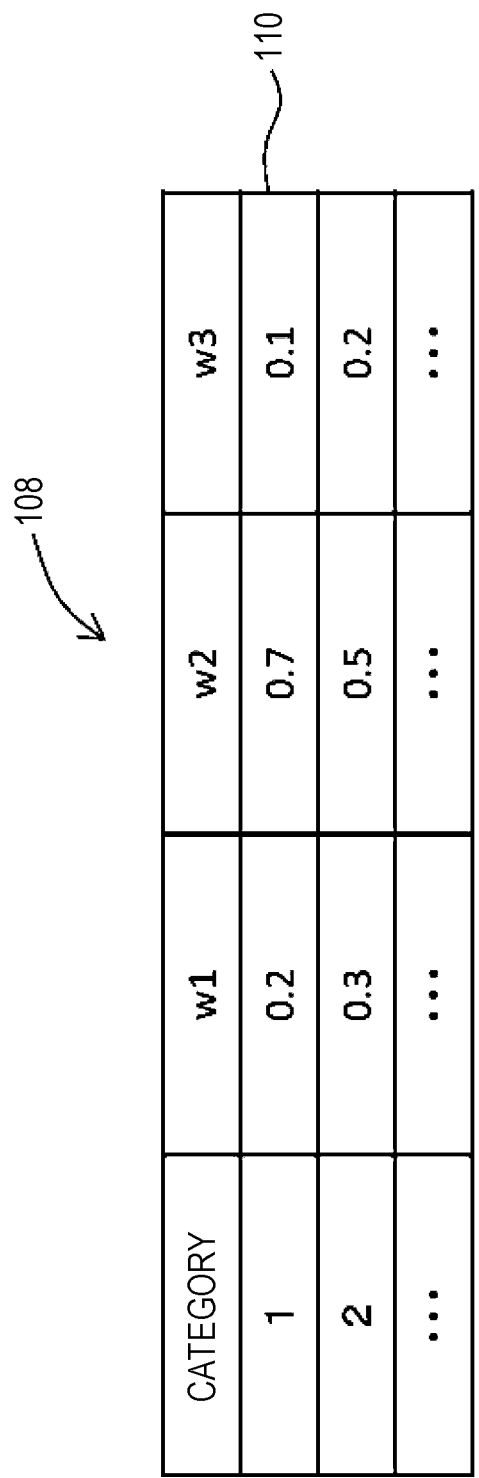
FIG. 8 is a diagram illustrating an exemplary weight list table.

FIG. 8 illustrates a weight list table 108 which has multiple weight lists 110. In the example in FIG. 8, the multiple weight lists 110 correspond to multiple document categories. When a specific document category is specified, a specific weight list 110 is selected.

For example, when a sub-score set of (0.3, 0.4, 0.4) and a weight list of (0.2, 0.7, 0.1) are used, a score of 0.38 is calculated. When a sub-score set of (0.6, 0.7, 0.8) and a weight list of (0.3, 0.5, 0.2) are used, a score of 0.69 is calculated. Selection of a weight list suitable for the condition achieves optimization of a score. In this case, a sub-score set itself may be maintained.

Figure 9:
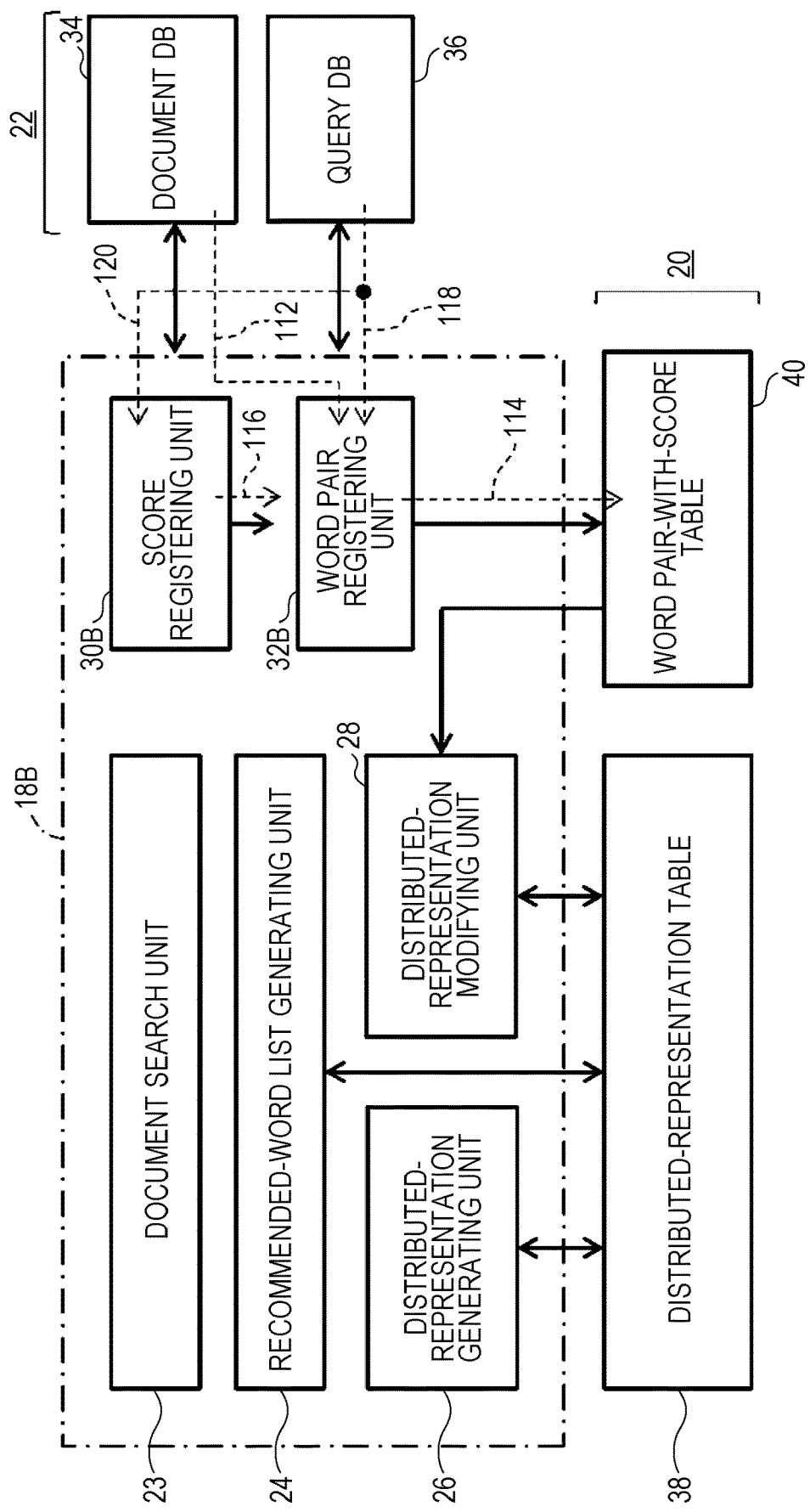
FIG. 9 is a diagram for describing collection of word pairs.

Selection of word pairs will be described on the basis of FIG. 9. For example, as indicated by using reference numeral 112, a word pair registering unit 32B may select word pairs, which are to be registered, from multiple documents stored in the document DB 34, and the selected word pairs may be registered (see reference numeral 114). As indicated by using reference numeral 118, the word pair registering unit 32B may select word pairs, which are to be registered, from multiple queries stored in the query DB 36, and the selected word pairs may be registered (see reference numeral 114). In registration of such word pairs, a score registering unit 30B may provide scores automatically for the respective word pairs extracted from the query DB 36. Alternatively, the scores may be provided in response to an instruction from an operator. The provided scores are registered (see reference numeral 116).

In the exemplary embodiments described above, a distributed representation is generated and modified by using a word as a unit. Alternatively, a distributed representation may be generated and modified by using a phrase, a sentence, a document, or the like as a unit. In the exemplary embodiments described above, a distributed-representation set is used for word recommendation. Alternatively, a distributed-representation set may be used in other use (such as document classification). User information about a user who has issued a query may be collected. On the basis of the user information, a score may be provided for a word included in the query. Alternatively, a weight list may be selected on the basis of user information. Scores may be provided for data sets each having three or more pieces of data, and a distributed-representation set may be modified on the basis of the multiple data sets with scores.

In the embodiments above, the term "processor" refers to hardware in a broad sense. Examples of the processor includes general processors (e.g., CPU: Central Processing Unit and MPU: microprocessing unit), dedicated processors (e.g., GPU: Graphics Processing Unit, ASIC: Application Specific Integrated Circuit, FPGA: Field Programmable Gate Array, and PLD: programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document data processing apparatus comprising:
   a memory that stores a distributed-representation set including a plurality of distributed representations corresponding to a plurality of pieces of data; and
   a processor configured to
      modify the distributed-representation set on a basis of a plurality of data pairs and a plurality of scores corresponding to the plurality of data pairs, the plurality of data pairs being subjected to learning,
   wherein the processor is configured to modify the distributed-representation set in such a manner that, for each data pair of the plurality of data pairs, a value indicating a relationship in a modified distributed-representation pair corresponding to the data pair comes close to a score corresponding to the data pair.

2. The document data processing apparatus according to claim 1,
wherein the processor is configured to modify the distributed-representation set in such a manner that a loss calculated by using a loss function is minimized, and
wherein the loss function involves calculation in which, for each data pair, the value indicating the relationship is subtracted from the score.

3. The document data processing apparatus according to claim 2,
wherein the value indicating the relationship is an inner product of two distributed representations included in the modified distributed-representation pair, and
wherein the score is a target value compared with the inner product.

4. The document data processing apparatus according to claim 1,
wherein the processor is configured to calculate the score for each data pair on a basis of a plurality of sub-scores defined for the data pair.

5. The document data processing apparatus according to claim 4,
wherein the processor is configured to calculate the score through weighted addition of the plurality of sub-scores.

6. The document data processing apparatus according to claim 5,
wherein the processor is configured to change a weight list on a basis of a user instruction or a document category, the weight list being used in the weighted addition.

7. The document data processing apparatus according to claim 2,
wherein the loss function further involves calculation, for each data pair, using a modified distributed-representation pair corresponding to a negative data pair specified by the data pair.

8. The document data processing apparatus according to claim 1,
wherein the plurality of data pairs are a plurality of data pairs with scores, the plurality of data pairs being subjected to learning,
wherein the memory stores a table including the plurality of data pairs with scores, and
wherein the processor is configured to refer to the table.

9. The document data processing apparatus according to claim 1,
wherein the plurality of data pairs are a plurality of data pairs with sub-score sets, the plurality of data pairs being subjected to learning,
wherein the memory stores a table including the plurality of data pairs with sub-score sets, and
wherein the processor is configured to refer to the table.

10. The document data processing apparatus according to claim 1,
wherein the processor is configured to specify the plurality of data pairs on a basis of a plurality of queries which are input in searching documents.

11. The document data processing apparatus according to claim 1,
wherein the processor is configured to
generate a recommendation list on a basis of the distributed-representation set, the recommendation list including one or more pieces of related data, the related data being related to data which is input by a user, and
present the recommendation list to a user.

12. A non-transitory computer readable medium storing a program causing a computer to execute a process for processing document data, the process comprising:
referring to a score for each data pair subjected to learning, the score corresponding to the data pair; and
modifying a distributed-representation table including a plurality of distributed representations corresponding to a plurality of pieces of data, the modification being performed in such a manner that, for each data pair subjected to learning, a value indicating a relationship in a modified distributed-representation pair corresponding to the data pair comes close to the score corresponding to the data pair.

13. A document data processing apparatus comprising:
means for storing a distributed-representation set including a plurality of distributed representations corresponding to a plurality of pieces of data; and
means for modifying the distributed-representation set on a basis of a plurality of data pairs and a plurality of scores corresponding to the plurality of data pairs, the plurality of data pairs being subjected to learning,
wherein the distributed-representation set is modified in such a manner that, for each data pair of the plurality of data pairs, a value indicating a relationship in a modified distributed-representation pair corresponding to the data pair comes close to a score corresponding to the data pair.

* * * * *